(12) United States Patent
Groves et al.

(10) Patent No.: US 12,109,084 B2
(45) Date of Patent: Oct. 8, 2024

(54) IRRIGATOR FLUIDIC COMMUNICATION

(71) Applicant: KONINKLIJKE PHILIPS N.V., Eindhoven (NL)

(72) Inventors: Jeffrey Groves, Seattle, WA (US); Aaldert Geert Zijlstra, Zuidlaren (NL); Nathan Farrell, Kirkland, WA (US); Klass Kooijker, Drachten (NL); Joldert Maria Boersma, Zuidhorn (NL); Desalegn Gebresilassie, Drachten (NL); Egbert Van De Veen, Usselmuiden (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 645 days.

(21) Appl. No.: 17/422,412

(22) PCT Filed: Jan. 14, 2020

(86) PCT No.: PCT/EP2020/050735
§ 371 (c)(1),
(2) Date: Jul. 12, 2021

(87) PCT Pub. No.: WO2020/148241
PCT Pub. Date: Jul. 23, 2020

(65) Prior Publication Data
US 2022/0117710 A1 Apr. 21, 2022

Related U.S. Application Data

(60) Provisional application No. 62/791,965, filed on Jan. 14, 2019.

(51) Int. Cl.
*A61C 17/028* (2006.01)
*A61C 15/00* (2006.01)
*A61C 17/02* (2006.01)

(52) U.S. Cl.
CPC .......... *A61C 17/028* (2013.01); *A61C 15/00* (2013.01); *A61C 17/0202* (2013.01); *A61C 17/0217* (2013.01)

(58) Field of Classification Search
CPC .......... A61C 17/02–036; A61C 15/00; A61H 13/005
See application file for complete search history.

(56) References Cited

U.S. PATENT DOCUMENTS 3,480,981 A * 12/1969 Murov ................ A61C 17/38
601/163
4,619,612 A 10/1986 Weber et al.
(Continued)

FOREIGN PATENT DOCUMENTS

CN 203829079 U 9/2014
CN 105849449 A 8/2016
(Continued)

OTHER PUBLICATIONS

English translation for JP H1066625, machine translated by espacenet.com.*
(Continued)

*Primary Examiner* — Tu A Vo

(57) ABSTRACT

An oral irrigator having an irrigator tip, the tip including a handle portion, a tip portion, a channel in fluid communication with the tether and arranged within the handle portion and the tip portion, and an actuator located on or within the handle portion, the actuator arranged to at least partially altar a flow of a fluid through the channel. The oral irrigator further includes a housing, the housing having a reservoir in fluid communication with a pump sub-assembly, a sensor arranged to measure a first pressure or first electrical load within the pump sub-assembly, and a control unit arranged to control an operational current provided to the pump sub-assembly where operation of the actuator produces a
(Continued)

second pressure or electrical load measured by the sensor and the control unit is arranged to alter the operational current of the motor in response to the change.

9 Claims, 10 Drawing Sheets

(56) References Cited

U.S. PATENT DOCUMENTS

| | | | | |
|---|---|---|---|---|
| 4,648,838 | A * | 3/1987 | Schlachter | A61C 1/088 |
| | | | | 433/29 |
| 4,669,453 | A * | 6/1987 | Atkinson | A61M 3/0275 |
| | | | | 601/161 |
| 4,886,452 | A | 12/1989 | Loehn | |
| 5,419,703 | A * | 5/1995 | Warrin | A61C 1/0084 |
| | | | | 433/86 |
| 6,030,215 | A * | 2/2000 | Ellion | A61C 17/028 |
| | | | | 222/324 |
| 11,918,530 | B2 * | 3/2024 | Senff | A61C 17/0205 |
| 2014/0272769 | A1 | 9/2014 | Luettgen | |
| 2015/0147717 | A1 | 5/2015 | Taylor | |
| 2017/0239132 | A1 | 8/2017 | Luettgen | |
| 2017/0252251 | A1 | 9/2017 | Williams | |
| 2017/0258552 | A1 * | 9/2017 | Yared | A61C 5/50 |
| 2018/0125221 | A1 * | 5/2018 | Wronski | A61C 17/36 |
| 2018/0168784 | A1 | 6/2018 | Wagner | |
| 2018/0193108 | A1 * | 7/2018 | Guenst | A61C 17/0211 |
| 2020/0268494 | A1 * | 8/2020 | Senff | A61H 13/005 |

FOREIGN PATENT DOCUMENTS

| | | |
|---|---|---|
| CN | 108778182 A | 11/2018 |
| DE | 3734864 C2 | 6/1994 |
| EP | 0138119 B1 | 1/1988 |
| GB | 2538309 A | 11/2016 |
| JP | H1066625 A * | 3/1998 |

OTHER PUBLICATIONS

International Search Report and Written Opinion of PCT/EP2020/050735, dated Mar. 12, 2020.

* cited by examiner

IRRIGATOR FLUIDIC COMMUNICATION

This application is the U.S. National Phase application under 35 U.S.C. § 371 of International Application No. PCT/EP020/050735, filed on Jan. 14, 2020, which claims the benefit of U.S. Provisional Patent Application Ser. No. 62/791,965, filed Jan. 14, 2019. These applications are hereby incorporated by reference herein.

FIELD OF THE DISCLOSURE

The present disclosure is directed generally to systems and methods for irrigator control for oral care appliances, specifically, for control of oral care appliances via fluidic communication.

BACKGROUND

Many consumers find water flossing via an irrigator easier and more pleasant than using string floss. As a result of the enhanced user experience, users who regularly clean their teeth with these devices do so more frequently than those that do not, leading to better overall oral hygiene. Accordingly, the oral care appliance industry has been producing more and more irrigators to keep up with increased demand.

Most commercially available irrigators include a housing having a reservoir filed with a liquid, a motor, and pump arranged to create a positive pressure to move the liquid within the reservoir to an external irrigator tip. The irrigator tip generally includes a handle portion, a tip portion, and a tether arranged to guide pressurized fluid from the reservoir to the handle and tip portion of the irrigator tip and subsequently into the mouth of the user.

Currently, most of these irrigators are controlled via a control unit which has at least one button, knob, and/or switch. The control unit is typically positioned within the housing of the device. This arrangement can detract from user experience as the user needs two hands to operate the device, i.e., a first hand to hold the irrigator tip within their mouth, and a second hand to operate the controls on the housing.

SUMMARY OF THE DISCLOSURE

There is a continued need for an irrigator that allows the user to directly control the pump operating state from the handle.

The present disclosure is directed to an inventive oral irrigator having an irrigator tip, the tip including a handle portion, a tip portion, a channel in fluid communication with the tether and arranged within the handle portion and the tip portion, and an actuator located on or within the handle portion, the actuator arranged to at least partially altar a flow of a fluid through the channel. The oral irrigator further includes a housing, the housing having a reservoir in fluid communication with a pump sub-assembly, a sensor arranged to measure a first pressure within the pump sub-assembly, and a control unit arranged to control an operational current provided to the pump sub-assembly wherein, operation of the actuator produces a second pressure measured by the sensor, and the control unit is arranged to alter the operational current in response to a change from the first pressure to the second pressure.

Generally in one aspect, an oral irrigator is provided, the oral irrigator includes an irrigator tip having a handle portion, a tip portion, a channel in fluid communication with the handle portion and the tip portion, and an actuator located on or within the handle portion, the actuator arranged to at least partially alter a flow of a fluid through the channel, a having a reservoir containing the fluid, the reservoir in fluid communication with a pump sub-assembly, a pressure sensor arranged to measure a first pressure, a control unit arranged to control an operational current provided to the pump sub-assembly or arranged to control a control valve of the pump-sub assembly and a tether having a first end and a second end, the first end of the tether in fluid communication with the irrigator tip and the second end of the tether in fluid communication with the pump sub-assembly. Operation of the actuator produces a second pressure measured by the sensor, and the control unit is arranged to alter the operational current or at least partially alter the flow via the control valve in response to a change from the first pressure to the second pressure.

In another aspect, the actuator comprises a mechanical valve assembly which further includes a depressible piston valve, the piston valve having a first flow path therethrough, the first flow path substantially parallel to the channel, a biasing element arranged to exert a first force on the piston valve in a first direction.

In another aspect, a second force, exerted by a user on the piston valve in a second direction, opposite the first direction, shifts the first flow path out of fluid communication with the channel, at least partially impeding the flow of the fluid through the channel leaving the mechanical valve assembly in a closed state.

In another aspect, the first pressure corresponds with the first state of the mechanical valve assembly and the second pressure corresponds with the closed state of the mechanical valve assembly.

In another aspect, the mechanical valve assembly includes a depressible piston valve, the piston valve having a first flow path and a second flow path therethrough, the first flow path and the second flow path substantially parallel to the channel, a biasing element arranged to exert a first force on the piston valve in a first direction. The first flow path has a first diameter and the second flow path has a second diameter where the first diameter is smaller than the second diameter; and in the first state, the first force on the piston valve creates fluid communication through the first flow path.

In another aspect, a second force, exerted by a user on the piston valve in a second direction, opposite the first direction, shifts the first flow path out of fluid communication with the channel, and shifts the second flow path into fluid communication with the channel leaving the mechanical valve assembly in a second state.

In another aspect, a third force, exerted by the user on the piston valve in the second direction, opposite the first direction, shifts the second flow path out of fluid communication with the channel at least partially impeding the flow of the fluid through the channel leaving the mechanical valve assembly in a closed state.

In another aspect, the first pressure corresponds with the first state of the mechanical valve assembly, the second pressure corresponds with the second state of the mechanical valve assembly, and a third pressure corresponds with the closed state of the mechanical valve assembly.

In another aspect, the control unit is arranged to detect a rhythmic change from the first state to the second state, or the second state to the third state, and in response to detection of the rhythmic the control unit is arranged to alter the operational current or at least partially alter the flow via the control valve in response to a change from the first pressure to the second pressure.

In another aspect, the depressible piston valve is a single unibody structure, the piston valve further including a first piston valve portion arranged to contact a user and connected with the second flow path, a second portion between the second flow path and the first flow path, a third portion connected with the first flow path and arranged to contact the biasing element, a first connector arranged within the first flow path connecting the second portion and the third portion, and a second connector arranged with the second flow path connecting the first portion and second portion.

In another aspect, an oral irrigator is provided, the oral irrigator includes an irrigator tip, the irrigator tip including a handle portion, a tip portion, a channel in fluid communication with the tether and arranged within the handle portion and the tip portion, and an actuator, the actuator located on or within the handle portion, the actuator arranged to at least partially altar a flow of a fluid through the channel. The oral irrigator also includes a housing, the housing having a reservoir containing the fluid, the reservoir in fluid communication with a pump sub-assembly, a load sensor arranged to measure a first electrical load within a motor of the pump sub-assembly, and a control unit arranged to control an operational current provided to the motor, and a tether having a first end and a second end, the first end of the tether in fluid communication with the irrigator tip and the second end of the tether in fluid communication with the pump sub-assembly. Operation of the actuator produces a second electrical load within the motor of the pump sub-assembly measured by the load sensor, and the control unit is arranged to alter the operational current in response to a change from the first electrical load to the second electrical load.

In another aspect, the actuator comprises a mechanical valve assembly which further includes a depressible piston valve, the piston valve having a first flow path therethrough, the first flow path substantially parallel to the channel, a biasing element arranged to exert a first force on the piston valve in a first direction. In a first state, the first force on the piston valve creates fluid communication through the first flow path.

In another aspect, a second force, exerted by a user on the piston valve in a second direction, opposite the first direction, shifts the first flow path out of fluid communication with the channel, at least partially impeding the flow of the fluid through the channel leaving the mechanical valve assembly in a closed state.

In another aspect, the first electrical load corresponds with the first state of the mechanical valve assembly and the second electrical load corresponds with the closed state of the mechanical valve assembly.

In another aspect, an oral irrigator is provided, the oral irrigator including an irrigator tip having a handle portion, a tip portion, and a channel in fluid communication with the handle portion and the tip portion. The oral irrigator further including an actuator arranged to at least partially alter a flow of a fluid through the channel, a reservoir containing the fluid in fluid communication with a pump sub-assembly, a sensor arranged to detect a change in the flow, and a control unit arranged to control the flow within the oral irrigator in response to the measured flow.

In another aspect, the change in flow is caused by a change in pressure, a change in a load on a motor, or a change in speed of the motor.

These and other aspects of the various embodiments will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various embodiments.

DETAILED DESCRIPTION OF EMBODIMENTS

The present disclosure describes various embodiments of an oral irrigator having an irrigator tip, the tip including a handle portion, a tip portion, a channel in fluid communication with the tether and arranged within the handle portion and the tip portion, and an actuator located on or within the handle portion, the actuator arranged to at least partially altar a flow of a fluid through the channel. The oral irrigator further includes a housing, the housing having a reservoir in fluid communication with a pump sub-assembly, a sensor arranged to measure a first pressure or electrical load within the pump sub-assembly, and a control unit arranged to control an operational current provided to the pump sub-assembly wherein, operation of the actuator produces a second pressure measured by the sensor and the control unit is arranged to alter the operational current in response to a change from the first pressure to the second pressure.

Figure 1:
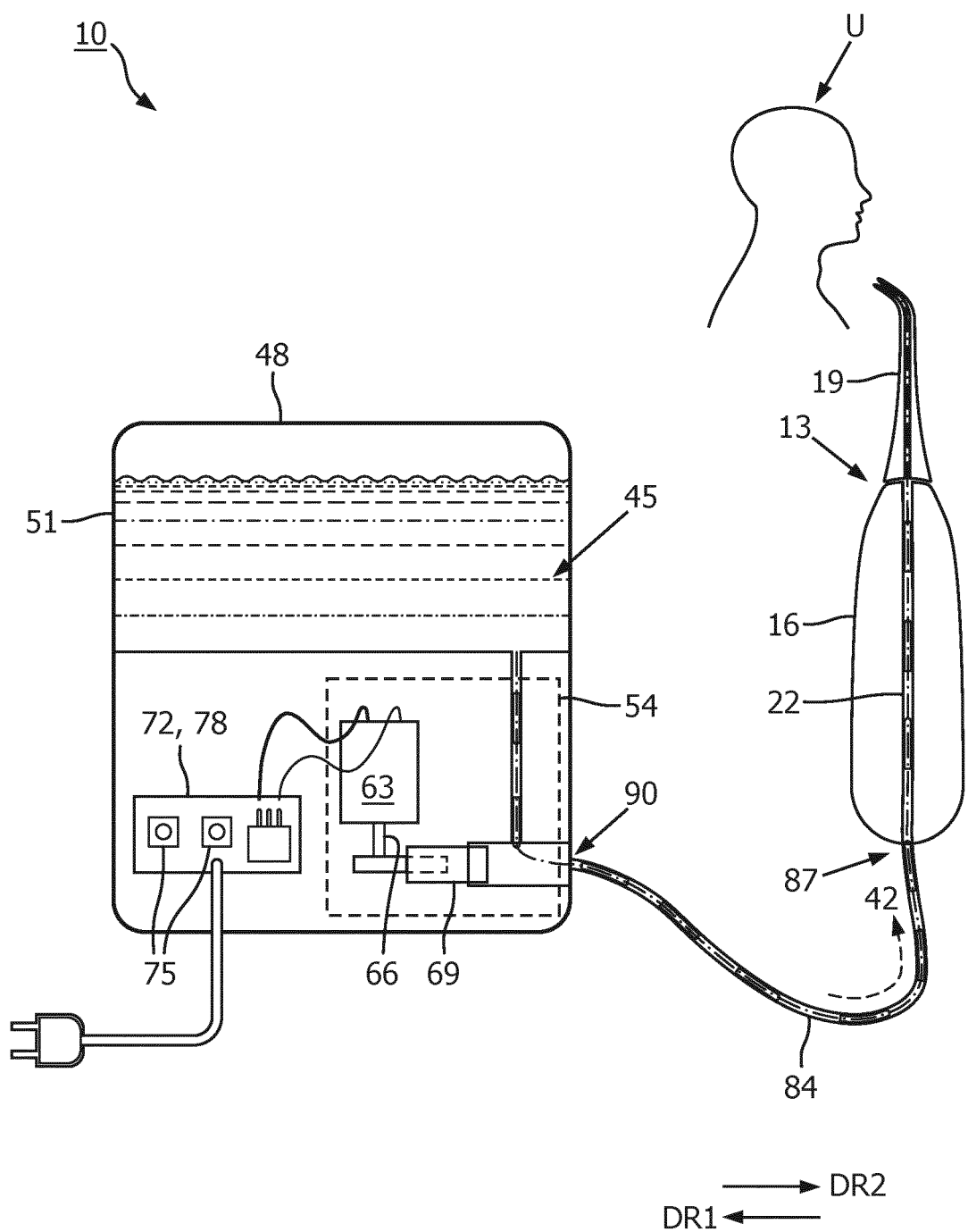
FIG. 1 is an oral irrigator according to the prior art.

Referring to the figures, FIG. 1 illustrates oral irrigator 10 according to the prior art. Oral irrigator 10 includes irrigator tip 13 having handle portion 16 and tip portion 19. Irrigator tip 13 further includes channel 22 which extends within and through both tip portion 13 and handle portion 16. Channel 22 provides flow 42 of fluid 45 to user U. Oral irrigator 10 further includes housing 48 which contains reservoir 51, pump sub-assembly 54, control unit 72, and power supply 78. Pump sub-assembly 54 further includes motor 63, crank 66, and piston 69. Control unit 72 includes controls 75. Controls 75 are utilized to turn oral irrigator 10 into an on or off state and/or alter the settings or modes of motor 63 thus changing the flow 42 of liquid 45 provided to user U. Tether 84 has a first end 87 and a second end 90. First end 87 is fixedly secured to irrigator tip 13 and second end 90 is fixedly secured to pump sub-assembly 54.

The arrangement of controls 75 on control unit 72 requires the use of two hands to operate oral irrigator 10. The first hand is needed to hold irrigator tip 13 to the user's mouth and the second hand is needed to activate controls 75.

Figure 2:
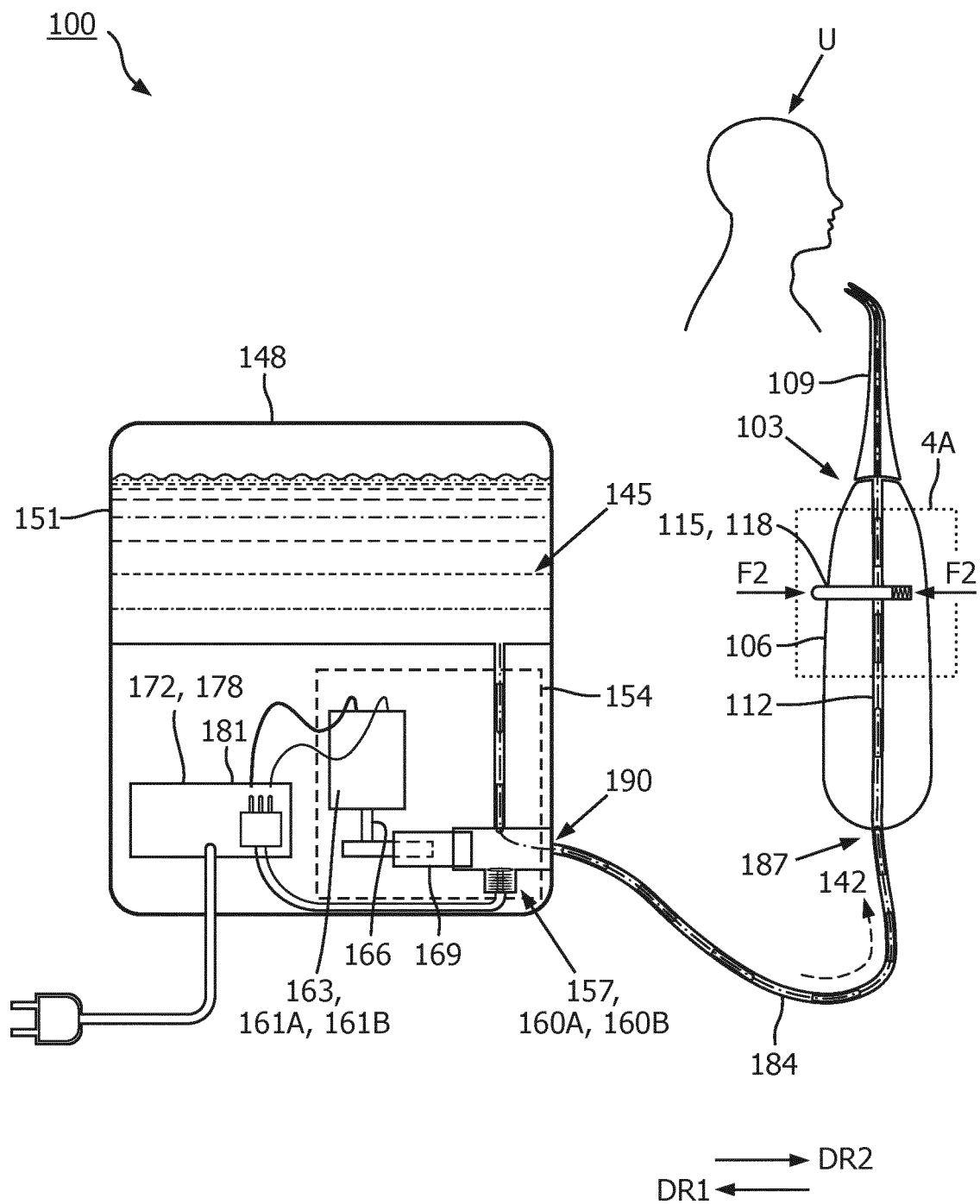
FIG. 2 is an example embodiment of an oral irrigator according to the present disclosure having a pressure sensor.

FIGS. 2-10 are directed to various illustrative embodiments of an oral irrigator that address one or more problems associated with foregoing arrangement in FIG. 1. FIG. 2 illustrates oral irrigator 100. Oral irrigator 100 includes irrigator tip 103 having handle portion 106 and tip portion 109. Irrigator tip 103 further includes channel 112 which extends within and through both tip portion 103 and handle portion 106. During use, a user U holds handle portion 106 of irrigator tip 103, and positions tip portion 109 within the user's mouth such that when oral irrigator 100 is turned on, a fluid (e.g., fluid 145 discussed below) is directed to user U's teeth cleaning away plaque and debris on the teeth and/or gums.

Irrigator tip 103 further includes actuator 115 positioned within a partial through-bore within handle portion 106 and is arranged to pass through channel 112. Actuator 115 further includes mechanical valve assembly 118. Mechanical valve assembly 118 includes piston valve 121 having first piston valve portion 124A, second piston valve portion 124B, and first connector 127A (all shown in FIG. 4A). First connector 127A is arranged within a gap between first piston valve portion 124A and second piston valve portion 124B. Mechanical valve assembly 118 further includes, first flow path 130A, biasing element 133, and friction-stop 136 (all shown in FIG. 4A). When in a first state 139A (shown in FIG. 4A), biasing element 133 is arranged to engage and exert first force F1 on second piston valve portion 124B in first direction DR1, placing first connector 127A, and the gap that it creates between first piston valve portion 124A and second piston valve portion 124B, substantially in-line with channel 112 creating first flow path 130A. First connector 127A is dimensioned such that its width or thickness is relatively small compared to the width of channel 112. In operation, user U exerts a second force F2 on first piston valve portion 124A of piston valve 121 in second direction DR2 opposite first direction DR1. Second force F2 displaces piston valve 121 in direction DR2 against biasing element 133 until friction-stop 136 secures piston valve 121 in a closed state 139B (shown in FIG. 4C) reducing or completely obstructing flow 142 of fluid 145. It should be appreciated that friction-stop 136 is not required in that the biasing element can be arranged to at least partially restrict motion of the piston valve 121 in second direction DR2. This obstruction of flow 142 generates a back pressure, or build-up of pressure within the system which propagates along flow 142 back to pump sub-assembly 154 discussed below. Although actuator 115 is illustrated and described in a similar manner to a piston valve, it should be appreciated that actuator 115 can be any actuator or valve known in the art capable of at least partially altering flow 142, i.e., increasing or decreasing flow 142, e.g., a ball valve, a butterfly valve, a choke valve, a diaphragm or membrane valve, a gate valve, a globe valve, a knife valve, a needle valve, a pinch valve, a plug valve, a solenoid valve, a spool valve, a check valve, etc.

Oral irrigator 100 further includes housing 148 which contains reservoir 151, pump sub-assembly 154, control unit 172, and power supply 178. Reservoir 151 contains a volume of fluid 145 which during operation of oral irrigator 100 is directed through irrigator tip 103 into the mouth of user U. Fluid 145 can be selected from, for example, water, a water-gas mixture, oral cleansing concentrate, standard or antiseptic (alcohol based) mouthwash, or any fluid with a viscosity low enough to proceed through channel 112. Pump sub-assembly 154 comprises pressure sensor 157. Pressure sensor 157 is arranged to detect a first pressure 160A a second pressure 160B. First pressure 160A is associated with first state 139A when first flow path 130A is substantially aligned with channel 112. Second pressure 160B is associated with closed state 139B, when first flow path 130A is not substantially aligned with channel 112 and where flow 142 of fluid 145 through channel 112 is partially or completely restricted. Preferably, first pressure 160A and second pressure 160B are measured within the pump sub-assembly 154; however, it should be appreciated that first pressure 160A and second pressure 160B could be measured at any point along flow 142 spanning from the reservoir 151 to piston valve 121. Accordingly, although pressure sensor 157 is illustrated within pump-sub-assembly 154, it should be appreciated that pressure sensor 157 could be placed at any point along flow 142 spanning from the reservoir 151 to piston valve 121.

Pump sub-assembly 154 further comprises motor 163, crank 166, and piston 169. Motor 163, crank 166, and piston 169 work in concert to create a pressurized environment that facilitates flow 142 from reservoir 151, through tether 184, into irrigator tip 103 and into user U's mouth. Tether 184 is a substantially hollow, flexible tube, having a first end 187 and a second end 190. First end 187 of tether 184 is fixedly secured to handle portion 106 of irrigator tip 103 and second end 190 of tether 184 is fixedly secured to pump sub-assembly 154. Tether 184 functions as a conduit through which flow 142 of fluid 145 precedes from reservoir 151 to irrigator tip 103 and into user U's mouth for cleaning.

Control unit 172 further comprises a processor and memory arranged to execute a series of non-transitory computer readable instructions to control the operation of motor 163. Control unit 172 receives electrical power from power supply 178 and is arranged to control the speed and/or power of motor 163 by adjusting an operational current 181 of motor 163. Control unit 172 receives first pressure 160A and second pressure 160B from pressure sensor 157 and adjusts the speed and/or power of motor 163, accordingly. For example, in one example embodiment, first pressure 160A is less than second pressure 160B. When user U exerts second force F2 onto actuator 115 in second direction DR2, effectively switching the mechanical valve assembly 118 from first state 139A to closed state 139B (shown in FIG. 4C), pressure sensor 157 relays the change from the first pressure 160A associated with first state 139A to second pressure 160B associated with closed state 139B (shown in FIG. 4C) to control unit 172. In response to this change, control unit 172 reduces operational current 181 which in-turn reduces the speed and/or power of motor 163 according to a predefined setting, or proportionally to the change in pressure. This reduction in operational pressure prevents vibrations from continuously operating the motor under an increase in pressure (i.e., second pressure 160B) and in-turn prevents propagation of said vibrations to user U through tether 184, thus increasing the user's comfort and experience while using the device.

It should be appreciated that the foregoing arrangement can detect a change in pressure, i.e., a change from first pressure 160A to second pressure 160B subject to a pre-defined threshold, for example, a change from first state 139A to closed state 139B may generate a pressure difference between first pressure 160A and second pressure 160B of 500%, that is, second pressure 160B is five times the magnitude of first pressure 160A; however, this threshold can vary, e.g., to any threshold sufficient enough to differentiate between natural fluctuations in the operation of pump sub-assembly 154 and a change in pressure caused by a change in state of the mechanical valve assembly 118. It should further be appreciated that pressure differences above this threshold could also be utilized to generate a rhythmic pressure sequence, i.e., when a user depresses the piston valve 121 changing it from first state 139A to closed state 139B in a cadence (e.g., "double-tapping" or "triple-tapping"). This cadence, received at the pressure sensor 157, could be transmitted to control unit 172, and control unit 172 would store the rhythmic pressure sequence in memory. When control unit 172 compares the stored rhythmic pressure sequence in memory and compares the received sequence with a database of stored sequences, the control unit 172 can increase or decrease the speed/power of motor 163 according to a mapped response to the matched sequence in the database.

Figure 3:
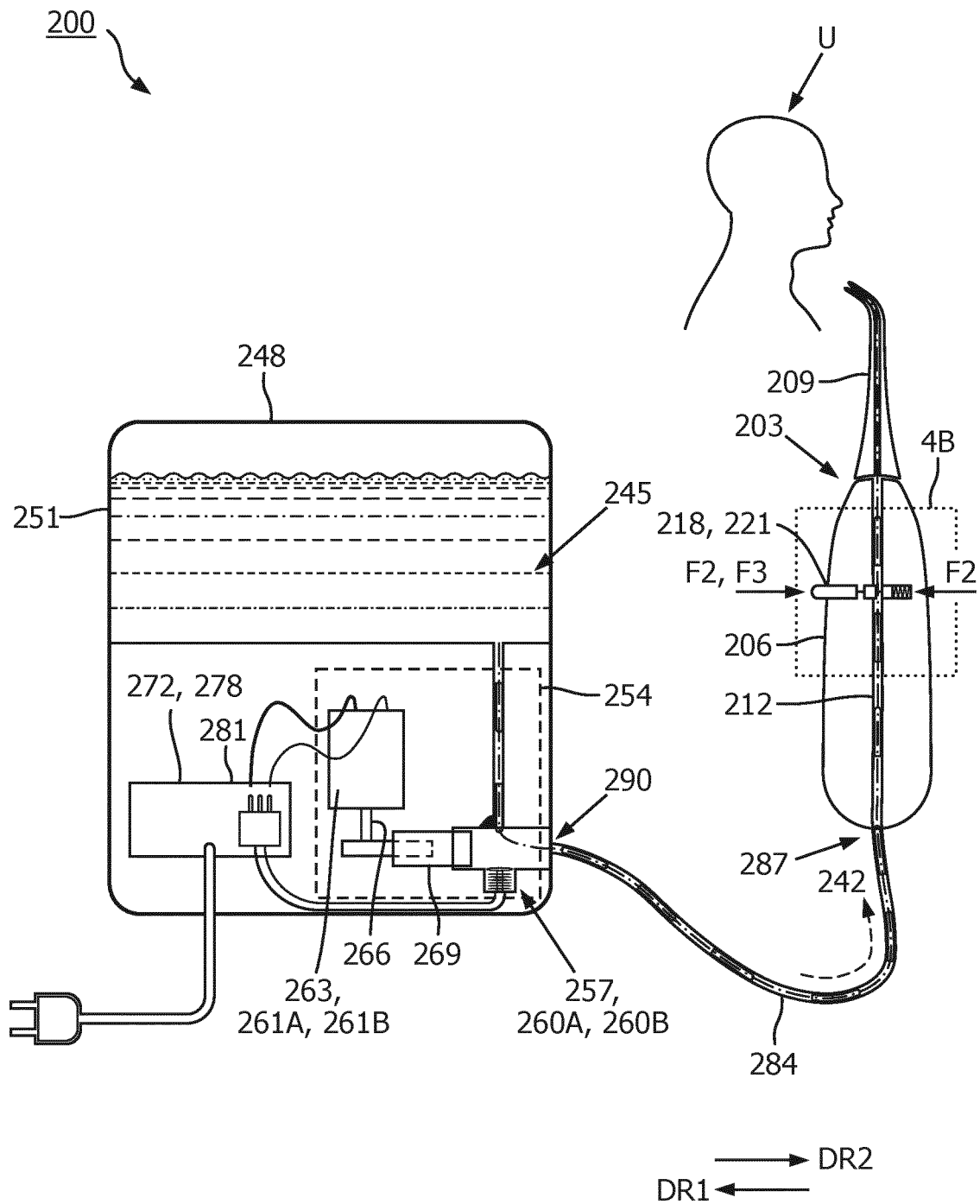
FIG. 3 is another example embodiment of an oral irrigator according to the present disclosure having a pressure sensor.

FIG. 3 illustrates oral irrigator 200. Oral irrigator 200 includes irrigator tip 203 having handle portion 206 and tip portion 209. Irrigator tip 203 further includes channel 212 which extends within and through both tip portion 203 and handle portion 206. During use, a user U holds handle portion 206 of irrigator tip 203, and positions tip portion 209 within the user's mouth such that when oral irrigator 200 is turned on, a fluid (e.g., fluid 245 discussed below) is directed to user U's teeth cleaning away plaque and debris on the teeth and/or gums.

Irrigator tip 203 further includes actuator 215 positioned within a partial through-bore within handle portion 206 and is arranged to pass through channel 212. Actuator 215 further includes mechanical valve assembly 218. Mechanical valve assembly 218 includes piston valve 221 having first piston valve portion 224A, second piston valve portion 224B, third piston valve portion 224C, first connector 227A, and second connector 227B (all shown in FIG. 4B). First connector 227A is arranged within a gap between second valve portion 224B and third valve portion 224B. Second connector 227B is arranged within a gap between first piston valve portion 224A and second piston valve portion 224B. First connector 227A and second connector 227B are dimensioned such that their widths or thicknesses are relatively small compared to the width of channel 212. Mechanical valve assembly 218 further includes, first flow path 230A, second flow path 230B, biasing element 233, and friction-stop 236 (all shown in FIG. 4B). When in a first state 239A, biasing element 233 is arranged to engage with an exert first force F1 on third piston valve portion 224C in first direction DR1, placing first connector 227A, and the gap that it creates between third piston valve portion 224C and second piston valve portion 224B, substantially in-line with channel 212 creating first flow path 230A. In operation, user U exerts a second force F2 on first piston valve portion 224A of piston valve 221 in second direction DR2 opposite first direction DR1. Second force F2 displaces piston valve 221 in direction DR2 against biasing element 233 until friction-stop 236 secures piston valve 221 in a second state 239B (not shown). Second state 239B (shown in FIG. 4D) corresponds with substantial alignment of second connector 227B and the gap it creates between first piston valve portion 224A and second piston valve portion 224B substantially in-line with channel 212 creating second flow path 230B. In one example embodiment first flow path 230A has a diameter D1 and second flow path 230B has a diameter D2 where D2 is larger than D1. It should also be appreciated that first flow path 230A and second flow path 230B could be arranged such that D1 is larger than D2, or D1 is equal to D2. This could be accomplished, for example, through changing the lengths of first connector 227A and second connector 227B. During subsequent use of oral irrigator 200, user U can exert a third force F3 on first piston valve portion 224A of piston valve 221 in direction DR2 against biasing element 233 until friction-stop 236 secures piston valve 221 in a closed state 239C (not shown) reducing or completely obstructing flow 242 of fluid 245. It should be appreciated that friction-stop 236 is not required in that the biasing element can be arranged to at least partially restrict motion of the piston valve 221 in second direction DR2. This change in flow rate and/or complete obstruction of flow 242 generates a back pressure, or build-up of pressure within the system which propagates along flow 242 back to pump sub-assembly 254 discussed below. Although actuator 215 is illustrated and described in a similar manner to a piston valve, it should be appreciated that actuator 215 can be any actuator or valve known in the art capable of at least partially altering flow 242, i.e., increasing or decreasing flow 242, e.g., a ball valve, a butterfly valve, a choke valve, a diaphragm or membrane valve, a gate valve, a globe valve, a knife valve, a needle valve, a pinch valve, a plug valve, a solenoid valve, a spool valve, a check valve, etc.

Oral irrigator 200 further includes housing 248 which contains reservoir 251, pump sub-assembly 254, control unit 272, and power supply 278. Reservoir 251 contains a volume of fluid 245 which during operation of oral irrigator 200 is directed through irrigator tip 203 into the mouth of user U. Fluid 245 can be selected from, for example, water, a water-gas mixture, oral cleansing concentrate, standard or antiseptic (alcohol based) mouthwash, or any fluid with a viscosity low enough to proceed through channel 212. Pump sub-assembly 254 comprises pressure sensor 257. Pressure sensor 257 is arranged to detect a first pressure 260A, a second pressure 260B, and third pressure 260C. First pressure 260A is associated with first state 239A when first flow path 230A is substantially aligned with channel 212. Second pressure 260B is associated with second state 239B (shown in FIG. 4D), when second flow path 230B is substantially aligned with channel 212. Third pressure 260C is associated with closed state 239C (not shown), when first flow path 230A and second flow path 230B are not substantially aligned with channel 212 and where flow 242 of fluid 245 through channel 212 is partially or completely restricted. Preferably, first pressure 260A, second pressure 260B, and third pressure 260C are measured within the pump sub-assembly 254; however, it should be appreciated that first pressure 260A, second pressure 260B, and third pressure 260C could be measured at any point along flow 242 spanning from the reservoir 251 to piston valve 221. Accordingly, although pressure sensor 257 is illustrated within pump-sub-assembly 254, it should be appreciated that pressure sensor 257 could be placed at any point along flow 242 spanning from the reservoir 251 to piston valve 221.

Pump sub-assembly 254 further comprises motor 263, crank 266, and piston 269. Motor 263, crank 266, and piston 269 work in concert to create a pressurized environment that facilitates flow 242 from reservoir 251, through tether 284, into irrigator tip 203 and into user U's mouth. Tether 284 is a substantially hollow, flexible tube, having a first end 287 and a second end 290. First end 287 of tether 284 is fixedly secured to handle portion 206 of irrigator tip 203 and second end 290 of tether 284 is fixedly secured to pump sub-assembly 254. Tether 284 functions as a conduit through which flow 242 of fluid 245 precedes from reservoir 251 to irrigator tip 203 and into user U's mouth for cleaning.

Control unit 272 further comprises a processor and memory arranged to execute a series of non-transitory computer readable instructions to control the operation of motor 263. Control unit 272 receives electrical power from power supply 278 and is arranged to control the speed and/or power of motor 263 by adjusting an operational current 281 of motor 263. Control unit 272 receives first pressure 260A, second pressure 260B, and third pressure 260C from pressure sensor 257 and adjusts the speed and/or power of motor 263, accordingly. For example, in one example embodiment, first pressure 260A is less than second pressure 260B and second pressure 260B is less than third pressure 260C. When user U exerts second force F2 onto actuator 215 in second direction DR2, effectively switching the mechanical valve assembly 218 from first state 239A to second state 239B (shown in FIG. 4D), pressure sensor 257 relays the change from the first pressure 260A associated with first state 239A to second pressure 260B associated with second state 239B (shown in FIG. 4D) to control unit 272. Further, when user U exerts third force F3 onto actuator 215 in second direction DR2, effectively switching the mechanical valve assembly 218 from second state 239B to closed state 239C (not shown), pressure sensor 257 relays the change from the second pressure 260B associated with second state 239B to third pressure 260C associated with closed state 239C (not shown) to control unit 272. In response to these changes, control unit 272 reduces the operational current 282 of motor 263, thus reducing the speed and/or power of motor 263 according to a predefined setting, or proportionally to the change in pressure. This reduction in operational pressure prevents vibrations from continuously operating the motor under an increase in pressure (i.e., under second pressure 260B or third pressure 260C) and in-turn prevents propagation of said vibrations to user U through tether 284, thus increasing the user's comfort and experience while using the device.

It should also be appreciated that, second force F2 and third force F3 must be meet a minimum force required to release piston valve 221 from friction-stop 236. In the alternative to the example embodiment set forth above, it is also possible that second force F2 and third force F3 or any additional force not expressly described herein, when provided to piston valve 221, can simply release piston valve 221 from friction-stop 236 such that biasing element 233 can displace piston valve 221 in direction DR1, effectively switching the state of the mechanical valve assembly 218 from the second state 239B to first state 239A, or from closed state 239C (not shown) to second state 239B.

It should be appreciated that the foregoing arrangement can detect changes in pressure, i.e., a change from first pressure 260A to second pressure 260B, and/or a change in pressure from second pressure 260B to third pressure 260C, subject to a predefined threshold, for example, a change from first state 239A to closed state 239B may generate a pressure difference between first pressure 260A and third pressure 260C of 500%, that is, third pressure 260C is five times the magnitude of first pressure 260A; however, this threshold can vary, e.g., to any threshold sufficient enough to differentiate between natural fluctuations in the operation of pump sub-assembly 254 and a change in pressure cause by a change in state of the mechanical valve assembly 218. It should further be appreciated that pressure differences above this threshold could also be utilized to generate a rhythmic pressure sequence, i.e., when a user depresses the piston valve 221 changing it from first state 239A to second state 239B, or from second state 239B (shown in FIG. 4D) to closed state 239C (not shown) in a cadence (e.g., "double-tapping" or "triple-tapping"). This cadence, received at pressure sensor 257, could be transmitted to control unit 272, and control unit 272 would store the rhythmic pressure sequence in memory. When control unit 272 compares the stored rhythmic pressure sequence in memory and compares the received sequence with a database of stored sequences, the control unit 272 can increase or decrease the speed/power of motor 263 according to a mapped response to a matched sequence in the database.

Figure 4A:
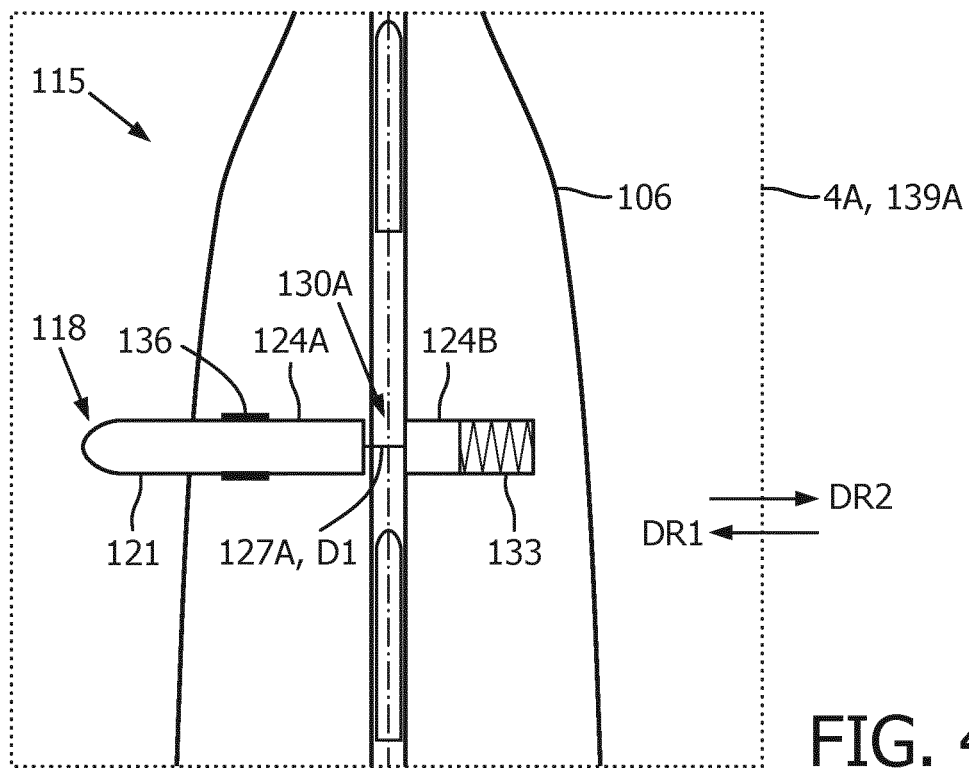
FIG. 4A is a detail view of the actuator and mechanical valve assembly enclosed in section 4A illustrated in FIG. 2 in a first state.
Figure 4B:
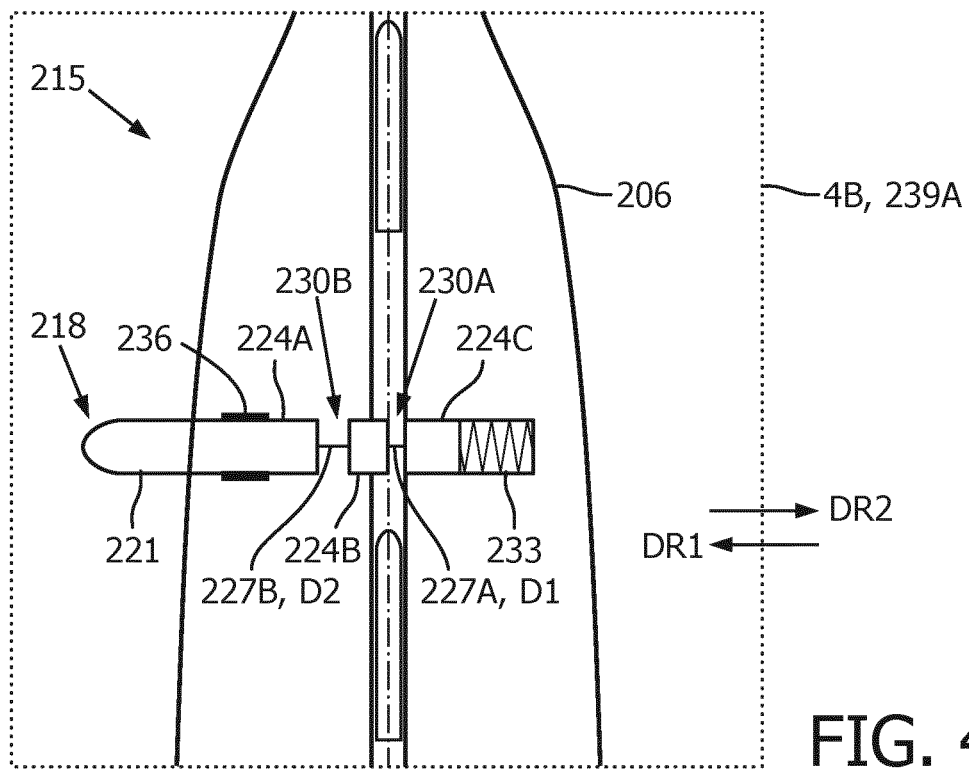
FIG. 4B is a detail view of the actuator and mechanical valve assembly enclosed in section 4B illustrated in FIG. 3 in a first state.
Figure 4C:
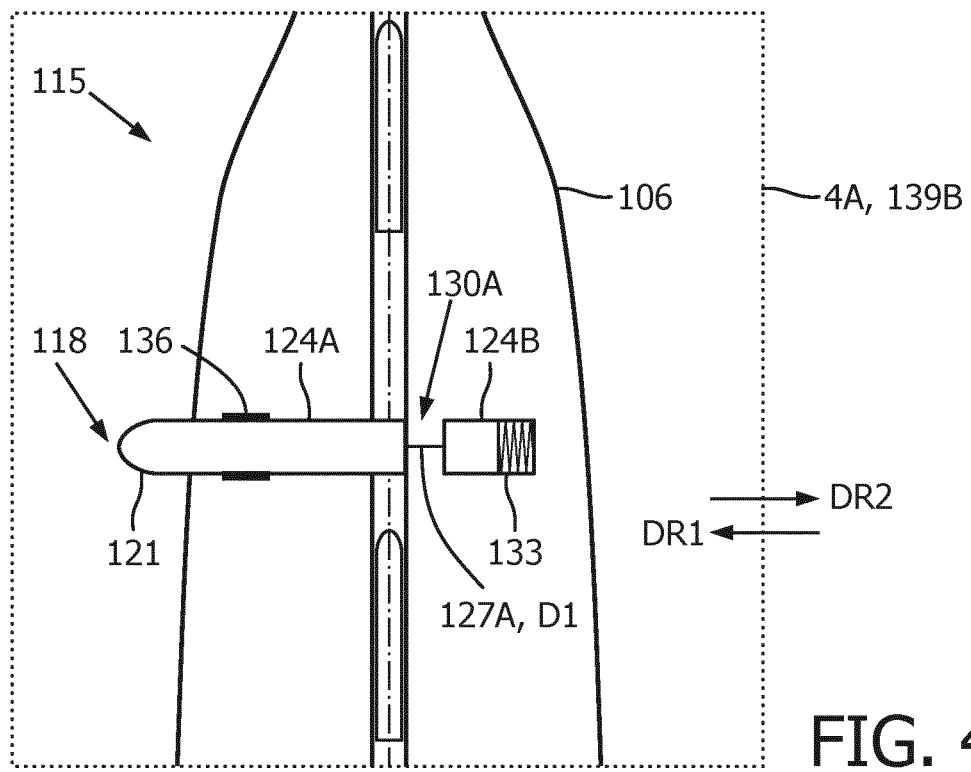
FIG. 4C is a detail view of the actuator and mechanical valve assembly enclosed in section 4A illustrated in FIG. 2 in a closed state.
Figure 4D:
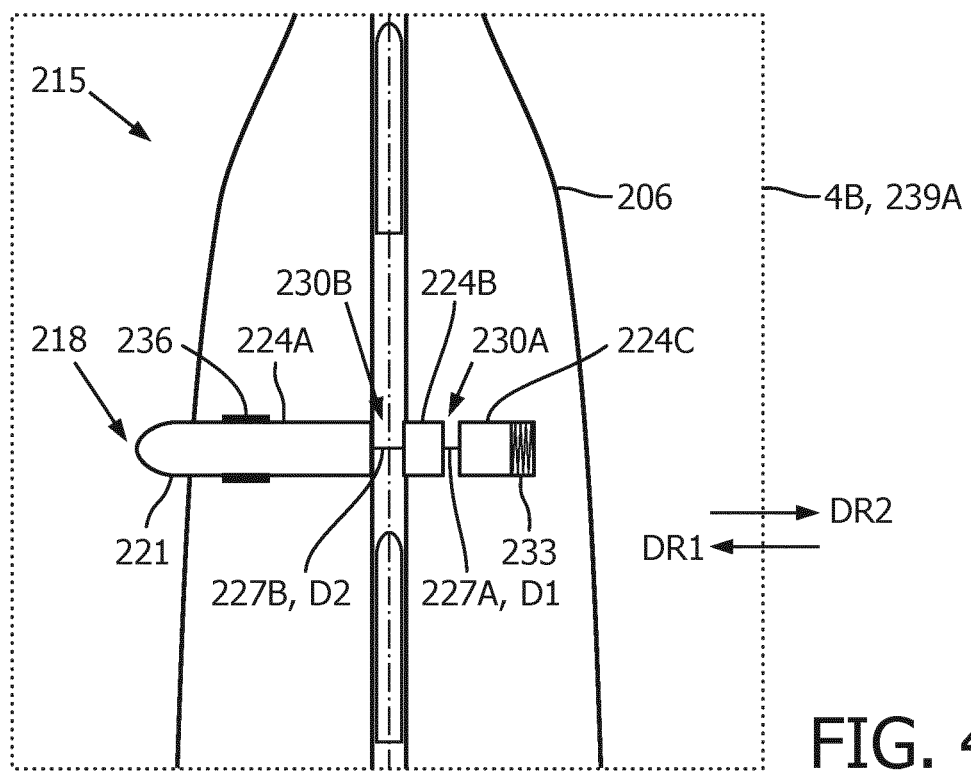
FIG. 4D is a detail view of the actuator and mechanical valve assembly enclosed in section 4B illustrated in FIG. 3 in a second state.

FIG. 4A illustrates a detail view of section 4A of mechanical valve assembly 118 shown in FIG. 2 in first state 139A where first flow path 130A is substantially aligned with channel 112. FIG. 4B illustrates a detail view of section 4B of mechanical valve assembly 218 shown in FIG. 3 in a first state 239A where first flow path 230A is substantially aligned with channel 212. FIG. 4C illustrates a detail view of section 4A of mechanical valve assembly 118 shown in FIG. 2 in a closed state 139B where first flow path 130A is not substantially aligned with channel 112. FIG. 4D illustrates a detail view of section 4B of mechanical valve assembly 218 shown in FIG. 3 in a second state 239B where second flow path 230B is substantially aligned with channel 212.

Figure 5:
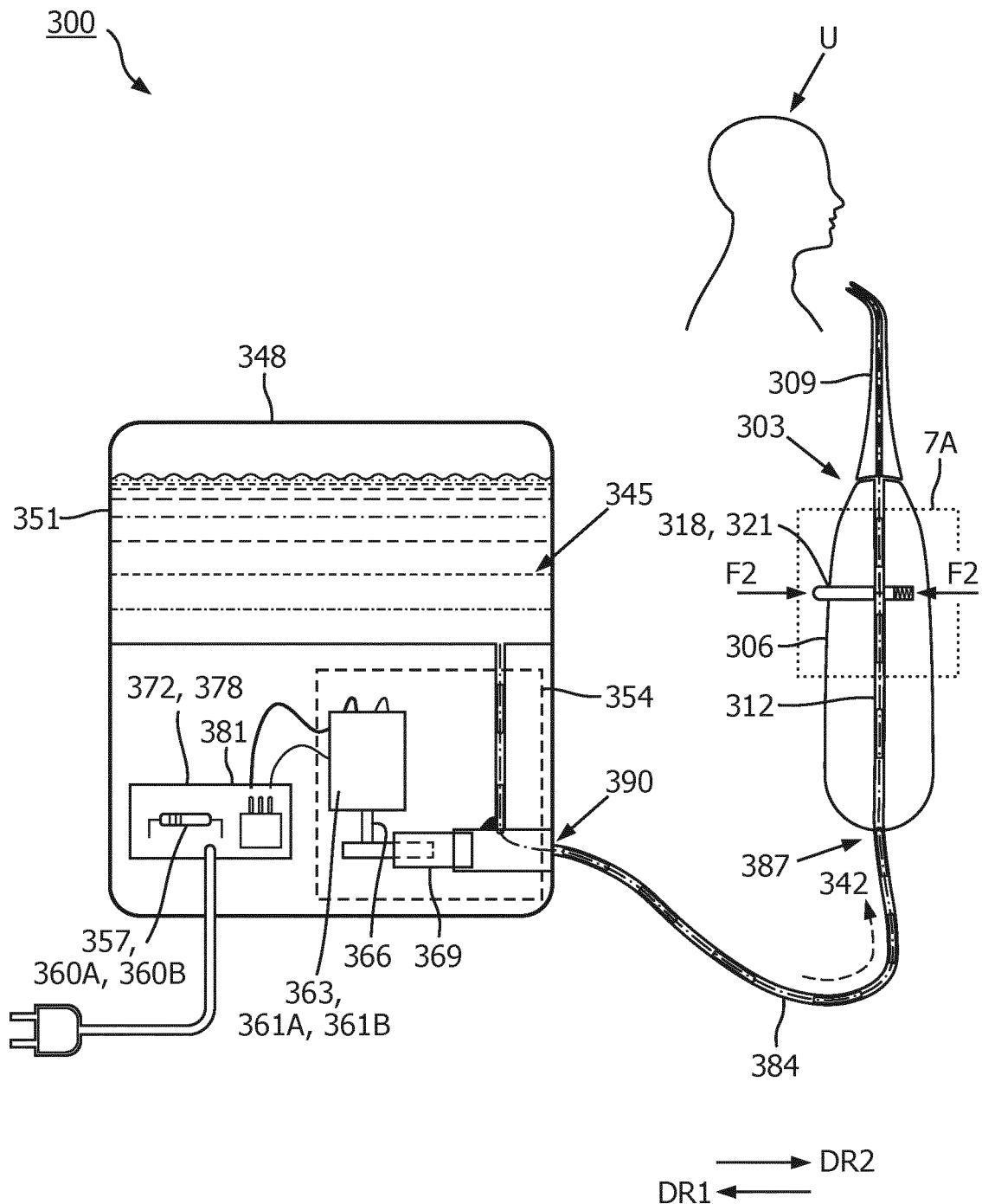
FIG. 5 is an example embodiment of an oral irrigator according to the present disclosure having a load sensor.

FIG. 5 illustrates oral irrigator 300. Oral irrigator 300 includes irrigator tip 303 having handle portion 306 and tip portion 309. Irrigator tip 303 further includes channel 312 which extends within and through both tip portion 303 and handle portion 306. During use, a user U holds handle portion 306 of irrigator tip 303, and positions tip portion 309 within the user's mouth such that when oral irrigator 300 is turned on, a fluid (e.g., fluid 345 discussed below) is directed to user U's teeth cleaning away plaque and debris on the teeth and/or gums.

Irrigator tip 303 further includes actuator 315 positioned within a partial through-bore within handle portion 306 and is arranged to pass through channel 312. Actuator 315 further includes mechanical valve assembly 318. Mechanical valve assembly 318 includes piston valve 321 having first piston valve portion 324A, second piston valve portion 324B, and first connector 327A (all shown in FIG. 7A). First connector 327A is arranged within a gap between first piston valve portion 324A and second piston valve portion 324B. First connector 327A is dimensioned such that its width or thickness is relatively small compared to the width of channel 312. Mechanical valve assembly 318 further includes, first flow path 330A, biasing element 333, and friction-stop 336 (all shown in FIG. 7A). When in a first state 339A, biasing element 333 is arranged to engage and exert first force F1 on second piston valve portion 324B in first direction DR1, placing first connector 327A, and the gap that it creates between first piston valve portion 324A and second piston valve portion 324B, substantially in-line with channel 312 creating first flow path 330A. In operation, user U exerts a second force F2 on first piston valve portion 324A of piston valve 321 in second direction DR2 opposite first direction DR1. Second force F2 displaces piston valve 321 in direction DR2 against biasing element 333 until friction-stop 336 secures piston valve 321 in a closed state 339B (shown in FIG. 7C) reducing or completely obstructing flow 342 of fluid 345. It should be appreciated that friction-stop 336 is not required in that the biasing element can be arranged to at least partially restrict motion of the piston valve 321 in second direction DR2. This obstruction of flow 342 generates a back pressure, or build-up of pressure within the system which propagates along flow 342 back to pump sub-assembly 354 discussed below. Although actuator 315 is illustrated and described in a similar manner to a piston valve, it should be appreciated that actuator 315 can be any actuator or valve known in the art capable of at least partially altering flow 342, i.e., increasing or decreasing flow 342, e.g., a ball valve, a butterfly valve, a choke valve, a diaphragm or membrane valve, a gate valve, a globe valve, a knife valve, a needle valve, a pinch valve, a plug valve, a solenoid valve, a spool valve, a check valve, etc.

Oral irrigator 300 further includes housing 348 which contains reservoir 351, pump sub-assembly 354, control unit 372, and power supply 378. Reservoir 351 contains a volume of fluid 345 which during operation of oral irrigator 300 is directed through irrigator tip 303 into the mouth of user U. Fluid 345 can be selected from, for example, water, a water-gas mixture, oral cleansing concentrate, standard or antiseptic (alcohol based) mouthwash, or any fluid with a viscosity low enough to proceed through channel 312.

Pump sub-assembly 354 comprises motor 363, crank 366, and piston 369. Motor 363, crank 366, and piston 369 work in concert to create a pressurized environment that facilitates flow 342 from reservoir 351, through tether 384, into irrigator tip 303 and into user U's mouth. Tether 384 is a substantially hollow, flexible tube, having a first end 387 and a second end 390. First end 387 of tether 384 is fixedly secured to and in fluid communication with handle portion 306 of irrigator tip 303 and second end 390 of tether 384 is fixedly secured to and in fluid communication with pump-sub-assembly 354. Tether 384 functions as a conduit through which flow 342 of fluid 345 precedes from reservoir 351 to irrigator tip 303 and into user U's mouth for cleaning.

Control unit 372 further comprises a processor and memory arranged to execute a series of non-transitory computer readable instructions to control the operation of motor 363. Control unit 372 receives electrical power from power supply 378 and is arranged to control the speed and/or power of motor 363 by adjusting an operational current 381 of motor 363. Control unit 372 comprises load sensor 357. Load sensor 357 is arranged to detect a first load 360A, a second load 360B, and/or a first motor speed 361A and a second motor speed 361B, on motor 363. To this end, load sensor 357 may be a current sensor or a sensor arranged to measure motor speed or rotations, e.g., a tachometer. First load 360A is associated with first state 339A when first flow path 330A is substantially aligned with channel 312. Second load 360B is associated with closed state 339B, when first flow path 330A is not substantially aligned with channel 312 and where flow 342 of fluid 345 through channel 312 is partially or completely restricted creating a back pressure within the system sufficient to change the load on motor 363. Preferably, first load 360A, second load 360B, first motor speed 361A, and second motor speed 361B are measured by load sensor 357 engaged to communicate with control unit 372 and motor 363. Control unit 372, e.g., receives first load 360A and second load 360B from load sensor 357 and adjusts the speed and/or power of motor 363, accordingly. For example, in one example embodiment, first load 360A is less than second load 360B. When user U exerts second force F2 onto actuator 315 in second direction DR2, effectively switching the mechanical valve assembly 318 from first state 339A to closed state 339B (shown in FIG. 7C), load sensor 357 relays the change from the first load 360A associated with first state 339A to second load 360B associated with closed state 339B (shown in FIG. 7C). In response to this change, control unit 372 reduces the operational current 381 of motor 363 thus reducing the speed and/or power of motor 363 according to a predefined setting, or proportionally to the change in load. This results in a change in operating pressure and prevents vibrations from continuously operating the motor under an increase in load (i.e., second load 360B) and in-turn prevents propagation of said vibrations to user U through tether 384, thus increasing the user's comfort and experience while using the device.

It should be appreciated that the foregoing arrangement can detect a change in load, i.e., a change from first load 360A to second load 360B subject to a predefined threshold, for example, a change from first state 339A to closed state 339B may generate a load difference between first load 360A and second load 360B of 500%, that is, second load 360B is five times the magnitude of first load 360A; however, this threshold can vary, e.g., to any threshold sufficient enough to differentiate between natural fluctuations in the operation of pump sub-assembly 354 and a change in load cause by a change in state of the mechanical valve assembly 318. It should further be appreciated that load differences above this threshold could also be utilized to generate a rhythmic load sequence, i.e., when a user depresses the piston valve 321 changing it from first state 339A to closed state 339B in a cadence (e.g., "double-tapping" or "triple-tapping"). This cadence, received at the load sensor 357, could be transmitted to control unit 372, and control unit 372 would store the rhythmic load sequence in memory. When control unit 372 compares the stored rhythmic load sequence in memory and compares the received sequence with a database of stored sequences, the control unit 372 can increase or decrease the speed/power of motor 363 according to a mapped response to a matched sequence in the database. A similar arrangement and subsequent functionality of the control unit 372 may equally be applied to a detection in change from first motor speed 361A to second motor speed 361B.

Figure 6:
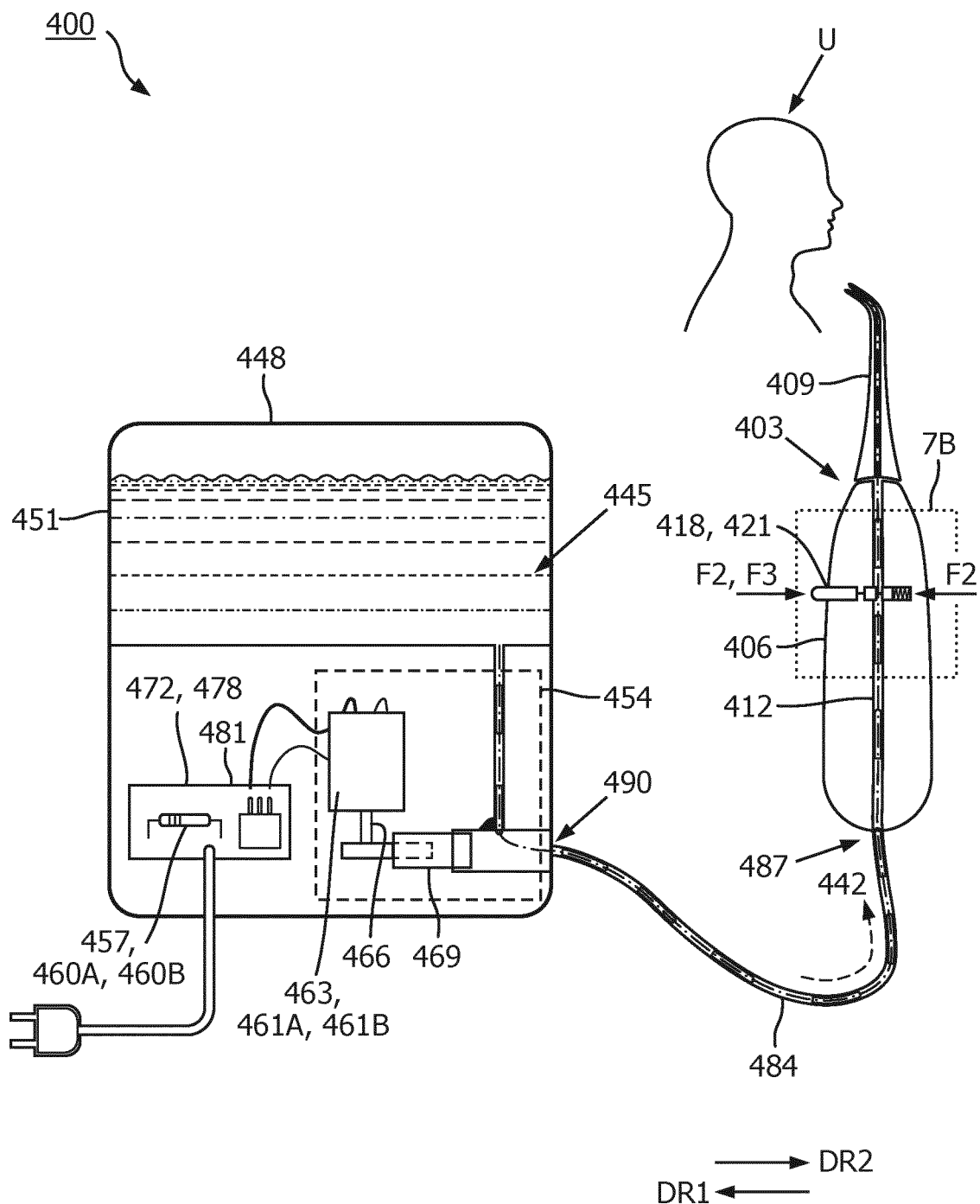
FIG. 6 is another example embodiment of an oral irrigator according to the present disclosure.

FIG. 6 illustrates oral irrigator 400. Oral irrigator 400 includes irrigator tip 403 having handle portion 406 and tip portion 409. Irrigator tip 403 further includes channel 412 which extends within and through both tip portion 403 and handle portion 406. During use, a user U holds handle portion 406 of irrigator tip 403, and positions tip portion 409 within the user's mouth such that when oral irrigator 400 is turned on, a fluid (e.g., fluid 445 discussed below) is directed to user U's teeth cleaning away plaque and debris on the teeth and/or gums.

Irrigator tip 403 further includes actuator 415 positioned within a partial through-bore within handle portion 406 and is arranged to pass through channel 412. Actuator 415 further includes mechanical valve assembly 418. Mechanical valve assembly 418 includes piston valve 421 having first piston valve portion 424A, second piston valve portion 424B, third piston valve portion 424C, first connector 427A, and second connector 427B (all shown in FIG. 7B). First connector 427A is arranged within a gap between second valve portion 424B and third valve portion 424B. Second connector 427B is arranged within a gap between first piston valve portion 424A and second piston valve portion 424B. First connector 427A and second connector 427B are dimensioned such that their widths or thicknesses are relatively small compared to the width of channel 412. Mechanical valve assembly 418 further includes, first flow path 430A, second flow path 430B, biasing element 433, and friction-stop 436 (all shown in FIG. 7B). When in a first state 439A, biasing element 433 is arranged to engage with an exert first force F1 on third piston valve portion 424C in first direction DR1, placing first connector 427A, and the gap that it creates, between third piston valve portion 424C and second piston valve portion 424B substantially in-line with channel 412 creating first flow path 430A. In operation, user U exerts a second force F2 on first piston valve portion 424A of piston valve 421 in second direction DR2 opposite first direction DR1. Second force F2 displaces piston valve 421 in direction DR2 against biasing element 433 until friction-stop 436 secures piston valve 421 in a second state 439B (shown in FIG. 7D). Second state 439B corresponds with substantial alignment of second connector 427B, and the gap it creates between first piston valve portion 424A and second piston valve portion 424B, with channel 412 creating second flow path 430B. In one example embodiment first flow path 430A has a diameter D1 and second flow path 430B has a diameter D2 where D2 is larger than D1. It should also be appreciated that first flow path 430A and second flow path 430B could be arranged such that D1 is larger than D2, or D1 is equal to D2. This could be accomplished, for example, through changing the lengths of first connector 427A and second connector 427B. During subsequent use of oral irrigator 400, user U can exert a third force F3 on first piston valve portion 424A of piston valve 421 in direction DR2 against biasing element 433 until friction-stop 436 secures piston valve 421 in a closed state 439C (not shown) reducing or completely obstructing flow 442 of fluid 445. It should be appreciated that friction-stop 436 is not required in that the biasing element can be arranged to at least partially restrict motion of the piston valve 421 in second direction DR2. This change in flow rate and/or complete obstruction of flow 442 generates a back pressure, or build-up of pressure within the system which propagates along flow 442 back to pump sub-assembly 454 discussed below. Although actuator 415 is illustrated and described in a similar manner to a piston valve, it should be appreciated that actuator 415 can be any actuator or valve known in the art capable of at least partially altering flow 442, i.e., increasing or decreasing flow 442, e.g., a ball valve, a butterfly valve, a choke valve, a diaphragm or membrane valve, a gate valve, a globe valve, a knife valve, a needle valve, a pinch valve, a plug valve, a solenoid valve, a spool valve, a check valve, etc.

Oral irrigator 400 further includes housing 448 which contains reservoir 451, pump sub-assembly 454, control unit 472, and power supply 478. Reservoir 451 contains a volume of fluid 445 which during operation of oral irrigator 400 is directed through irrigator tip 403 into the mouth of user U. Fluid 445 can be selected from, for example, water, a water-gas mixture, oral cleansing concentrate, standard or antiseptic (alcohol based) mouthwash, or any fluid with a viscosity low enough to proceed through channel 412.

Pump sub-assembly 454 comprises motor 463, crank 466, and piston 469. Motor 463, crank 466, and piston 469 work in concert to create a pressurized environment that facilitates flow 442 from reservoir 451, through tether 484, into irrigator tip 403 and into user U's mouth. Tether 484 is a substantially hollow, flexible tube, having a first end 487 and a second end 490. First end 487 of tether 484 is fixedly secured to pump sub-assembly 454 and second end 490 of tether 484 is fixedly secured to handle portion 406 of irrigator tip 403. Tether 484 functions as a conduit through which flow 442 of fluid 445 precedes from reservoir 451 to irrigator tip 403 and into user U's mouth for cleaning.

Control unit 472 further comprises a processor and memory arranged to execute a series of non-transitory computer readable instructions to control the operation of motor 463. Control unit 472 receives electrical power from power supply 478 and is arranged to control the speed and/or power of motor 463 by adjusting an operational current 481 of motor 463. Pump sub-assembly 454 comprises load sensor 457. Load sensor 457 is arranged to detect a first load 460A, a second load 460B, and third load 460C, or a first motor speed 461A and a second motor speed 461B. First load 460A is associated with first state 439A when first flow path 430A is substantially aligned with channel 412. Second load 460B is associated with second state 439B (shown in FIG. 7D), when second flow path 430B is substantially aligned with channel 412. Third load 460C is associated with closed state 439C (not shown), when first flow path 430A and second flow path 430B are not substantially aligned with channel 412 and where flow 442 of fluid 445 through channel 412 is partially or completely restricted. Preferably, first load 460A, second load 460B, third load 460C, first motor speed 461A, and second motor speed 461B are measured by load sensor 457. To this end, load sensor 457 may be a current sensor or a sensor arranged to measure motor speed or rotations, e.g., a tachometer. Control unit 472 receives first load 460A, second load 460B, and third load 460C from load sensor 457 and adjusts the speed and/or power of motor 463, accordingly. For example, in one example embodiment, first load 460A is less than second load 460B and second load 460B is less than third load 460C. When user U exerts second force F2 onto actuator 415 in second direction DR2, effectively switching the mechanical valve assembly 418 from first state 439A to second state 439B (shown in FIG. 7D), load sensor 457 relays the change from the first load 460A associated with first state 439A to second load 460B associated with second state 439B (shown in FIG. 7D) to control unit 472. Further, when user U exerts third force F3 onto actuator 415 in second direction DR2, effectively switching the mechanical valve assembly 418 from second state 439B (shown in FIG. 7D) to closed state 439C (not shown), load sensor 457 relays the change from the second load 460B associated with second state 439B (shown in FIG. 7D) to third load 460C associated with closed state 439C (not shown) to control unit 472. In response to these changes, control unit 472 reduces the operational current 481 of motor 463 thus reducing the speed and/or power of motor 463 according to a predefined setting, or proportionally to the change in pressure. The resulting reduction in operational pressure prevents vibrations from continuously operating the motor under an increase in load or pressure (i.e., under second load 460B or third load 460C) and in-turn prevents propagation of said vibrations to user U through tether 484, thus increasing the user's comfort and experience while using the device.

It should also be appreciated that, second force F2 and third force F3 must be meet a minimum force required to release piston valve 421 from friction-stop 436. In the alternative to the example embodiment set forth above, it is also possible that second force F2 and third force F3 or any additional force not expressly described herein, when provided to piston valve 421, can simply release piston valve 421 from friction-stop 436 such that biasing element 433 can displace piston valve 421 in direction DR1, effectively switching the state of the mechanical valve assembly 418 from the second state 439B (shown in FIG. 7D) to first state 439A, or from closed state 439C (not shown) to second state 439B (shown in FIG. 7D).

It should be appreciated that the foregoing arrangement can detect changes in load, i.e., a change from first load 460A to second load 460B, and/or a change in load from second load 460B to third load 460C, subject to a predefined threshold, for example, a change from first state 439A to closed state 439B may generate a load difference between first load 460A and third load 460C of 500%, that is, third load 460C is five times the magnitude of first load 460A; however, this threshold can vary, e.g., to any threshold sufficient enough to differentiate between natural fluctuations in the operation of pump sub-assembly 454 and a change in load caused by a change in state of the mechanical valve assembly 418. It should further be appreciated that load differences above this threshold could also be utilized to generate a rhythmic load sequence, i.e., when a user depresses the piston valve 421 changing it from first state 439A to second state 439B, or from second state 439B (shown in FIG. 7D) to closed state 439C (not shown) in a cadence (e.g., "double-tapping" or "triple-tapping"). This cadence, received at load sensor 457, could be transmitted to control unit 472, and control unit 472 would store the rhythmic load sequence in memory. When control unit 472 compares the stored rhythmic load sequence in memory and compares the received sequence with a database of stored sequences, the control unit 472 can increase or decrease the speed/power of motor 463 according to a mapped response to a matched sequence in the database. A similar arrangement and subsequent functionality of the control unit 472 may equally be applied to a detection in change from first motor speed 461A to second motor speed 461B.

Figure 7A:
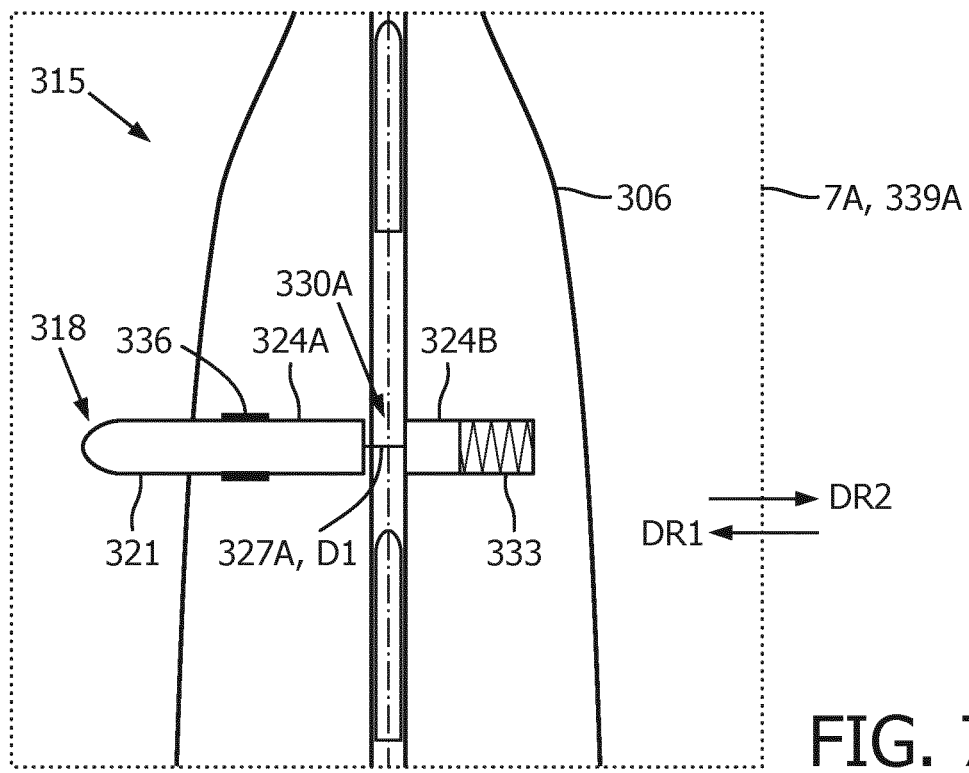
FIG. 7A is a detail view of the actuator and mechanical valve assembly enclosed in section 7A illustrated in FIG. 5.
Figure 7B:
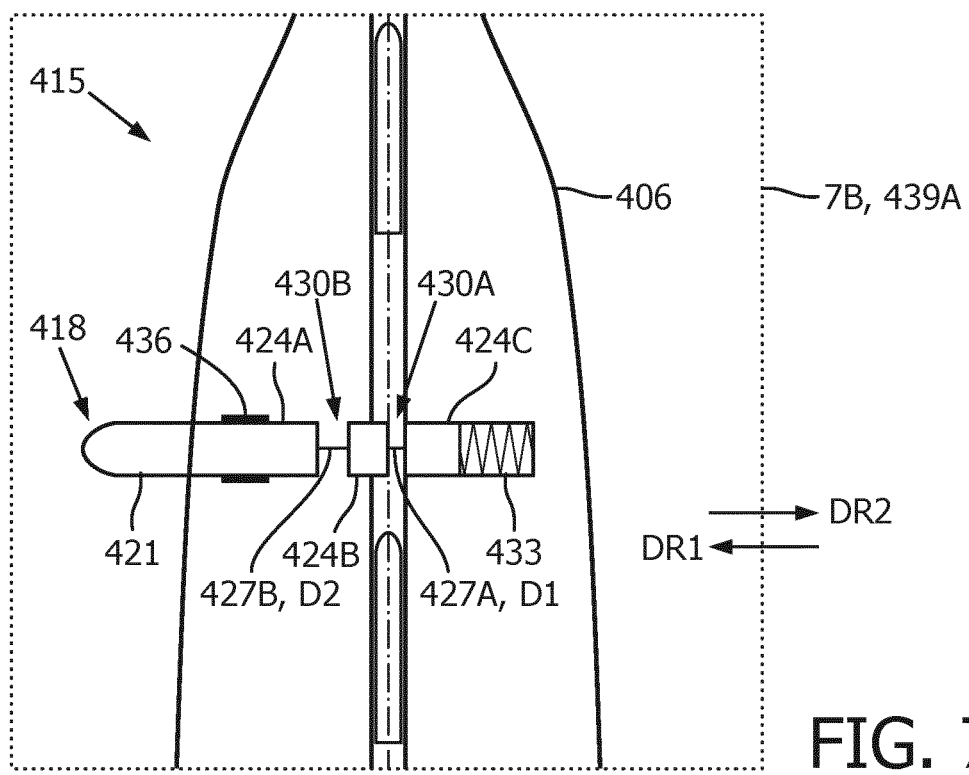
FIG. 7B is a detail view of the actuator and mechanical valve assembly enclosed in section 7B illustrated in FIG. 6.
Figure 7C:
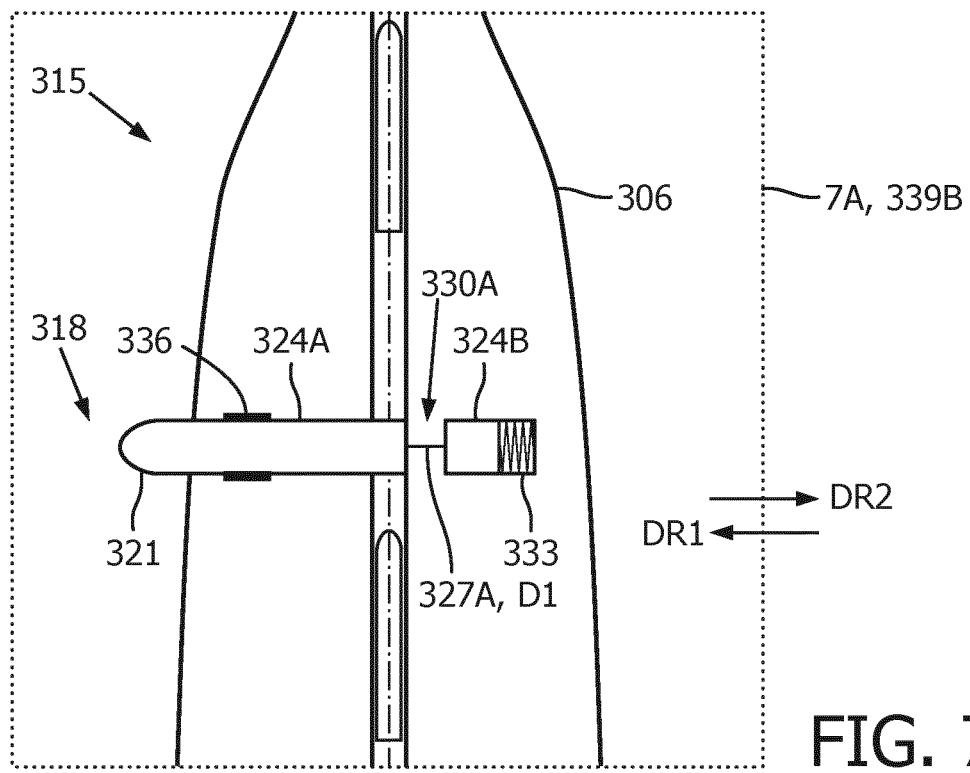
FIG. 7C is a detail view of the actuator and mechanical valve assembly enclosed in section 7A illustrated in FIG. 5 in a closed state.
Figure 7D:
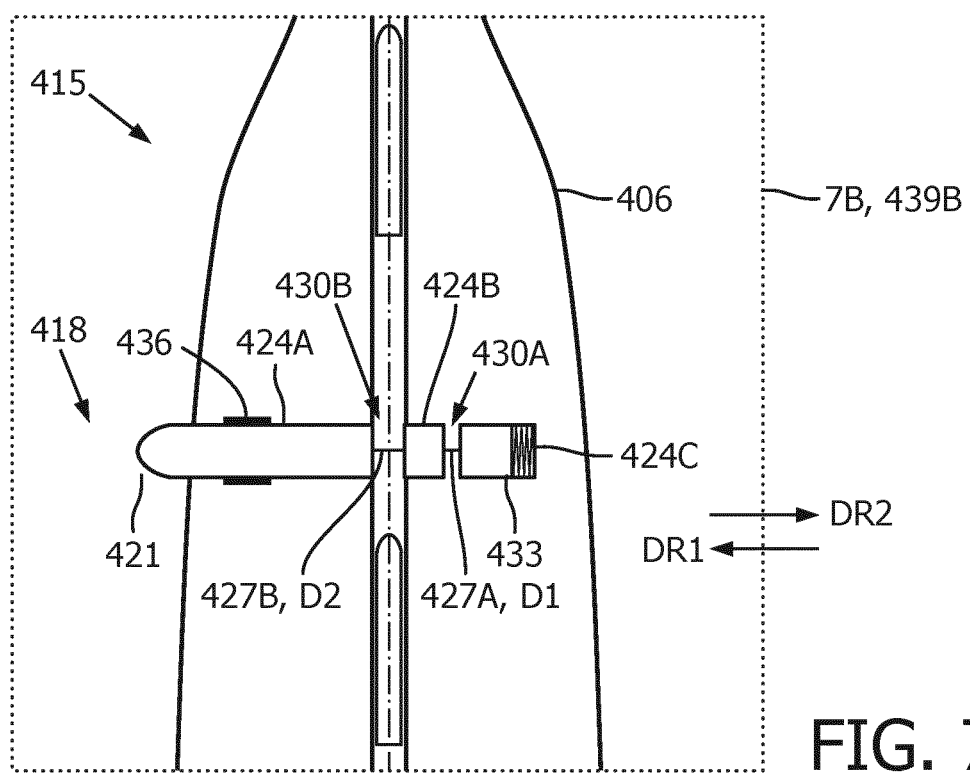
FIG. 7D is a detail view of the actuator and mechanical valve assembly enclosed in section 7B illustrated in FIG. 6 in a second state.

FIG. 7A illustrates a detail view of section 7A of mechanical valve assembly 318 shown in FIG. 5 in first state 339A where first flow path 330A is substantially aligned with channel 312. FIG. 7B illustrates a detail view of section 7B of mechanical valve assembly 418 shown in FIG. 6 in a first state 439A where first flow path 430A is substantially aligned with channel 412. FIG. 7C illustrates a detail view of section 7A of mechanical valve assembly 318 shown in FIG. 5 in a closed state 339B where first flow path 330A is not substantially aligned with channel 312. FIG. 7D illustrates a detail view of section 7B of mechanical valve assembly 418 shown in FIG. 6 in a second state 439B where second flow path 430B is substantially aligned with channel 412.

Figure 8:
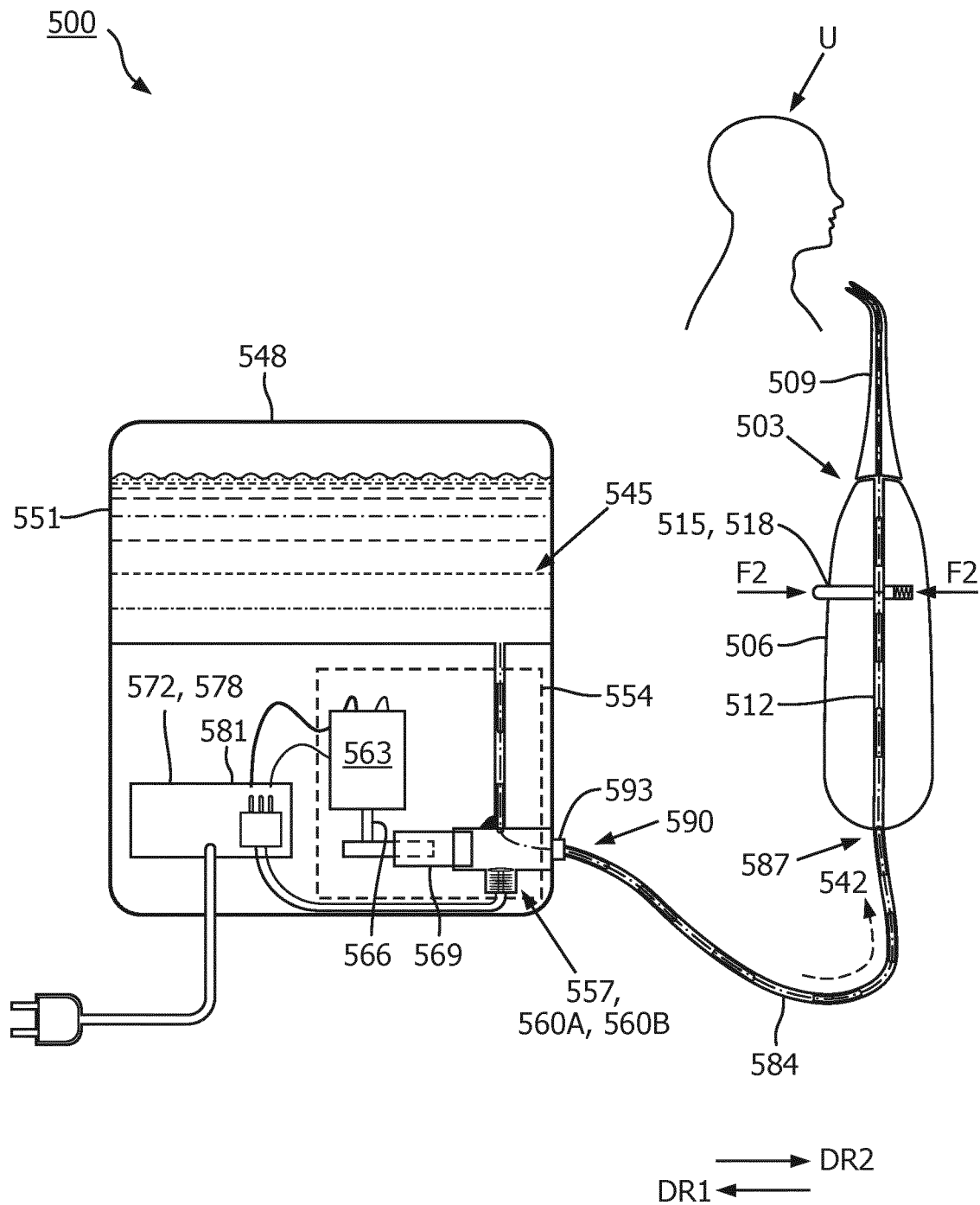
FIG. 8 is an example embodiment of an oral irrigator according to the present disclosure having a control valve.

FIG. 8 illustrates oral irrigator 500. Oral irrigator 500 includes irrigator tip 503 having handle portion 506 and tip portion 509. Irrigator tip 503 further includes channel 512 which extends within and through both tip portion 503 and handle portion 506. During use, a user U holds handle portion 506 of irrigator tip 503, and positions tip portion 509 within the user's mouth such that when oral irrigator 500 is turned on, a fluid (e.g., fluid 545 discussed below) is directed to user U's teeth cleaning away plaque and debris on the teeth and/or gums.

Irrigator tip 503 further includes actuator 515 positioned within a partial through-bore within handle portion 506 and is arranged to pass through channel 512. Actuator 515 further includes mechanical valve assembly 518. Mechanical valve assembly 518 includes piston valve 521 having first piston valve portion 524A, second piston valve portion 524B, and first connector 527A (all not shown). First connector 527A is arranged within a gap between first piston valve portion 524A and second piston valve portion 524B. Mechanical valve assembly 518 further includes, first flow path 530A, biasing element 533, and friction-stop 536 (all not shown). When in a first state 539A, biasing element 533 is arranged to engage and exert first force F1 on second piston valve portion 524B in first direction DR1, placing first connector 527A, and the gap that it creates between first piston valve portion 524A and second piston valve portion 524B, substantially in-line with channel 512 creating first flow path 530A. First connector 527A is dimensioned such that its width or thickness is relatively small compared to the width of channel 512. In operation, user U exerts a second force F2 on first piston valve portion 524A of piston valve 521 in second direction DR2 opposite first direction DR1. Second force F2 displaces piston valve 521 in direction DR2 against biasing element 533 until friction-stop 536 secures piston valve 521 in a closed state 539B (not shown) reducing or completely obstructing flow 542 of fluid 545. It should be appreciated that friction-stop 536 is not required in that the biasing element can be arranged to at least partially restrict motion of the piston valve 521 in second direction DR2. This obstruction of flow 542 generates a back pressure, or build-up of pressure within the system which propagates along flow 542 back to pump sub-assembly 554 discussed below.

Oral irrigator 500 further includes housing 548 which contains reservoir 551, pump sub-assembly 554, control unit 572, and power supply 578. Reservoir 551 contains a volume of fluid 545 which during operation of oral irrigator 500 is directed through irrigator tip 503 into the mouth of user U. Fluid 545 can be selected from, for example, water, a water-gas mixture, oral cleansing concentrate, standard or antiseptic (alcohol based) mouthwash, or any fluid with a viscosity low enough to proceed through channel 512. Pump sub-assembly 554 comprises pressure sensor 557. Pressure sensor 557 is arranged to detect a first pressure 560A a second pressure 560B. First pressure 560A is associated with first state 539A when first flow path 530A is substantially aligned with channel 512. Second pressure 560B is associated with closed state 539B, when first flow path 530A is not substantially aligned with channel 512 and where flow 542 of fluid 545 through channel 512 is partially or completely restricted. Preferably, first pressure 560A and second pressure 560B are measured within the pump sub-assembly 554; however, it should be appreciated that first pressure 560A and second pressure 560B could be measured at any point along flow 542 spanning from the reservoir 551 to piston valve 521. Accordingly, although pressure sensor 557 is illustrated within pump-sub-assembly 554, it should be appreciated that pressure sensor 557 could be placed at any point along flow 542 spanning from the reservoir 551 to piston valve 521.

Pump sub-assembly 554 further comprises motor 563, crank 566, piston 569, and control valve 593. Motor 563, crank 566, and piston 569 work in concert to create a pressurized environment that facilitates flow 542 from reservoir 551, through tether 584, into irrigator tip 503 and into user U's mouth. Tether 584 is a substantially hollow, flexible tube, having a first end 587 and a second end 590. First end 587 of tether 184 is fixedly secured to handle portion 506 of irrigator tip 503 and second end 590 of tether 584 is fixedly secured to control valve 593 of pump sub-assembly 554. Tether 584 functions as a conduit through which flow 542 of fluid 545 precedes from reservoir 551 to irrigator tip 503 and into user U's mouth for cleaning. Control valve 593 can selected from a globe valve, an angle seat piston valve, a butterfly valve, a ball valve, a pinch valve, a gate valve, a check valve or any other valve that can be actuated such that it restricts or completely impedes flow 542 into tether 584.

Control unit 572 further comprises a processor and memory arranged to execute a series of non-transitory computer readable instructions to control the operation of motor 563. Control unit 572 receives electrical power from power supply 578 and is arranged to engage control valve 593. Control unit 572 receives first pressure 560A and second pressure 560B from pressure sensor 557 and actuates control valve 593 accordingly. For example, in one example embodiment, first pressure 560A is less than second pressure 560B. When user U exerts second force F2 onto actuator 515 in second direction DR2, effectively switching the mechanical valve assembly 518 from first state 539A to closed state 539B (not shown), pressure sensor 557 relays the change from the first pressure 560A associated with first state 539A to second pressure 560B associated with closed state 539B to control unit 572. In response to this change, control unit 572 adjusts control valve 593 such that it directly controls the rate of flow through tether 584 according to a predefined setting, or proportionally to the change in pressure. This reduction in operational pressure prevents vibrations from continuously operating the motor under an increase in pressure (i.e., second pressure 560B) and in-turn prevents propagation of said vibrations to user U through tether 584, thus increasing the user's comfort and experience while using the device.

It should be appreciated that the foregoing arrangement can detect a change in pressure, i.e., a change from first pressure 560A to second pressure 560B subject to a predefined threshold, for example, a change from first state 539A to closed state 539B (not shown) may generate a pressure difference between first pressure 560A and second pressure 560B of 500%, that is second pressure 560B is five times the magnitude of first pressure 560A; however, this threshold can vary, e.g., to any threshold sufficient enough to differentiate between natural fluctuations in the operation of pump sub-assembly 554 and a change in pressure cause by a change in state of the mechanical valve assembly 518. It should further be appreciated that pressure differences above this threshold could also be utilized to generate a rhythmic pressure sequence, i.e., when a user depresses the piston valve 521 changing it from first state 539A to closed state 539B in a cadence (e.g., "double-tapping" or "triple-tapping"). This cadence, received at the pressure sensor 557, could be transmitted to control unit 572, and control unit 572 would store the rhythmic pressure sequence in memory. When control unit 572 compares the stored rhythmic pressure sequence in memory and compares the received sequence with a database of stored sequences, the control unit 572 can adjust control valve 593 according to a mapped response to a matched sequence in the database. Although oral irrigator 500 as described above and illustrated in FIG. 8 is described and illustrated as having substantially the same or similar elements as oral irrigator 100 with mechanical valve assembly 118 and all its component parts, as well as, pump sub-assembly 154 and all its component parts, it should further be appreciated that oral irrigator 500 could also utilize the various embodiments of mechanical valve assemblies 218, 318, and 418, as well as the various pump sub-assemblies 254, 354, and 454 described above.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

As used herein, the term "biasing element" is intended to mean any element that can absorb kinetic energy and store it as potential energy, and utilize the stored potential energy to generate a force on an object or element. For example, biasing element can refer to a compression spring, an extension spring, a torsion spring, a constant force spring, a Belleville spring, a helical spring, elastomeric foam, elastomeric plastic materials or any other material which can create a constant pressure or force on an object.

As used herein, the term 'friction-stop" is intended to mean a zone where sufficient frictional force is exerted on piston valves 121, 221, 321, 421, or 521, such that the static coefficient of friction on the piston valves in that zone prevents movement of piston valves 121, 221, 321, 421, and 521 in response to the constant force applied by biasing elements 133, 233, 333, 433, and 533, but that upon a sufficient force by a user, will allow movement of the piston valves in first direction DR1 or second direction DR2.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

What is claimed is:

1. An oral irrigator comprising:
   an irrigator tip, the irrigator tip comprising:
      a handle portion;
      a tip portion;
      a channel in fluid communication with the handle portion and the tip portion; and,
      an actuator, the actuator located on or within the handle portion, the actuator arranged to at least partially alter a flow of a fluid through the channel;
   a housing, the housing having a reservoir containing the fluid, the reservoir in fluid communication with a pump sub-assembly;
   a pressure sensor arranged to measure a first pressure; and,
   a control unit arranged to control an operational current provided to the pump sub-assembly or arranged to control a control valve of the pump-sub assembly; and,
   a tether having a first end and a second end, the first end of the tether in fluid communication with the irrigator tip and the second end of the tether in fluid communication with the pump sub-assembly;
   wherein, operation of the actuator produces a second pressure measured by the sensor, and the control unit is arranged to alter the operational current or at least partially alter the flow via the control valve in response to a change from the first pressure to the second pressure,
      wherein the actuator comprises a mechanical valve assembly comprising:
         a depressible piston valve, the piston valve having a first flow path and a second flow path therethrough, the first flow path and the second flow path substantially parallel to the channel; and,
         a biasing element arranged to exert a first force on the piston valve in a first direction;
            wherein the first flow path has a first diameter and the second flow path has a second diameter, the first diameter being smaller than the second diameter; and in a first state, the first force on the piston valve creates fluid communication through the first flow path.

2. The oral irrigator of claim 1, wherein a second force, exerted by a user on the piston valve in a second direction, opposite the first direction, shifts the first flow path out of fluid communication with the channel, and shifts the second flow path into fluid communication with the channel, leaving the mechanical valve assembly in a second state; and wherein a third force, exerted by the user on the piston valve in the second direction, opposite the first direction, shifts the second flow path out of fluid communication with the channel at least partially impeding the flow of the fluid through the channel, leaving the mechanical valve assembly in a closed state.

3. The oral irrigator of claim 2, wherein the first pressure corresponds with the first state of the mechanical valve assembly, the second pressure corresponds with the second state of the mechanical valve assembly, and a third pressure corresponds with the closed state of the mechanical valve assembly.

4. The oral irrigator of claim 3, wherein the control unit is arranged to detect a rhythmic change from the first state to the second state, or the second state to the third state, and in response to detection of the rhythmic the control unit is arranged to alter the operational current or at least partially alter the flow via the control valve in response to a change from the first pressure to the second pressure.

5. The oral irrigator of claim 1, wherein the depressible piston valve is a single unibody structure, the piston valve further comprising:
   a first piston valve portion arranged to connected with the second flow path;
   a second portion between the second flow path and the first flow path;
   a third portion connected with the first flow path and arranged to contact the biasing element;
   a first connector arranged within the first flow path connecting the second portion and the third portion; and,
   a second connector arranged with the second flow path connecting the first portion and the second portion.

6. An oral irrigator comprising:
   an irrigator tip the irrigator tip comprising:
      a handle portion;
      a tip portion;
      a channel in fluid communication with the handle portion and the tip portion; and,
      an actuator, the actuator located on or within the handle portion, the actuator arranged to at least partially alter a flow of a fluid through the channel;
   a housing, the housing having a reservoir containing the fluid, the reservoir in fluid communication with a pump sub-assembly;
   a load sensor arranged to measure a first electrical load within a motor of the pump sub-assembly or a first motor speed within the motor of the pump sub-assembly;
   a control unit arranged to control an operational current provided to the motor or arranged to control a control valve of the pump sub-assembly; and,
   a tether having a first end and a second end, the first end of the tether in fluid communication with the irrigator tip and the second end of the tether in fluid communication with the pump sub-assembly;
   wherein, operation of the actuator produces a second electrical load or second motor speed within the motor of the pump sub-assembly measured by the load sensor, and the control unit is arranged to alter the operational current or at least partially alter the flow via the control valve in response to a change from the first electrical load to the second electrical load.

7. The oral irrigator of claim 6, wherein the actuator comprises a mechanical valve assembly, the mechanical valve assembly further comprises:
- a depressible piston valve, the piston valve having a first flow path therethrough, the first flow path substantially parallel to the channel; and,
- a biasing element arranged to exert a first force on the piston valve in a first direction;
- wherein in a first state, the first force on the piston valve creates fluid communication through the first flow path.

8. The oral irrigator of claim 7, wherein a second force, exerted by a user on the piston valve in a second direction, opposite the first direction, shifts the first flow path out of fluid communication with the channel, at least partially impeding the flow of the fluid through the channel, leaving the mechanical valve assembly in a closed state.

9. The oral irrigator of claim 8, wherein the first electrical load corresponds with the first state of the mechanical valve assembly and the second electrical load corresponds with the closed state of the mechanical valve assembly.

* * * * *